United States Patent [19]
Boyd

[11] Patent Number: 5,613,536
[45] Date of Patent: Mar. 25, 1997

[54] FACEPLATE FOR TURNING OBJECTS ON A LATHE OR THE LIKE

[76] Inventor: David M. Boyd, 10402 Las Lunitas Ave., Tujunga, Calif. 91042

[21] Appl. No.: 371,273

[22] Filed: Dec. 23, 1994

[51] Int. Cl.⁶ .................................................. B27C 7/04
[52] U.S. Cl. .............................. 142/53; 82/150; 142/57
[58] Field of Search .......................... 142/53, 57; 82/150, 82/165

[56] References Cited

U.S. PATENT DOCUMENTS 268,393  12/1882  Evans ........................................ 142/53

OTHER PUBLICATIONS

Raffan, Richard, "Turning Wood With Richard Raffan" (Newtown, Ct: The Taunton Press), pp. 159–161. 1985.
Sainsbury, John, "John Sainsbury's Guide to Woodturning Tools and Equipment" (New York: Sterling Publishing), pp. 70–71. 1989.
John Jacob Holtzapffel, *Turning and Mechanical Manipulation, vol. IV: The Principles and Practice of Hand or Simple Turning* (London: Holtzapffel & Co., 1879), pp. 214–216.
The Woodturner's Catalog (1994/95), Craft Supplies USA, Oct. 1, 1994, p. 69.

*Primary Examiner*—Steven C. Bishop
*Attorney, Agent, or Firm*—Wagner & Middlebrook

[57] ABSTRACT

A faceplate for lathes and the like is fabricated of a polymeric material and having a body with a cylindrical surface of substantial depth and indicia marks on the cylindrical surface. The body is turnable just like workpieces on the lathe. The faceplate has a planar front face which is turnable to provide recesses for chucking a workpiece. In one embodiment designed to employ fasteners such as screws to hold the workpiece in place, the body is of one color and the fasteners are located in inserts of contrasting color. The faceplate is intended to be turned. If any chips of the contrasting color appear, the user knows instantly that further turning will cause the chisel to strike the fasteners.

5 Claims, 4 Drawing Sheets

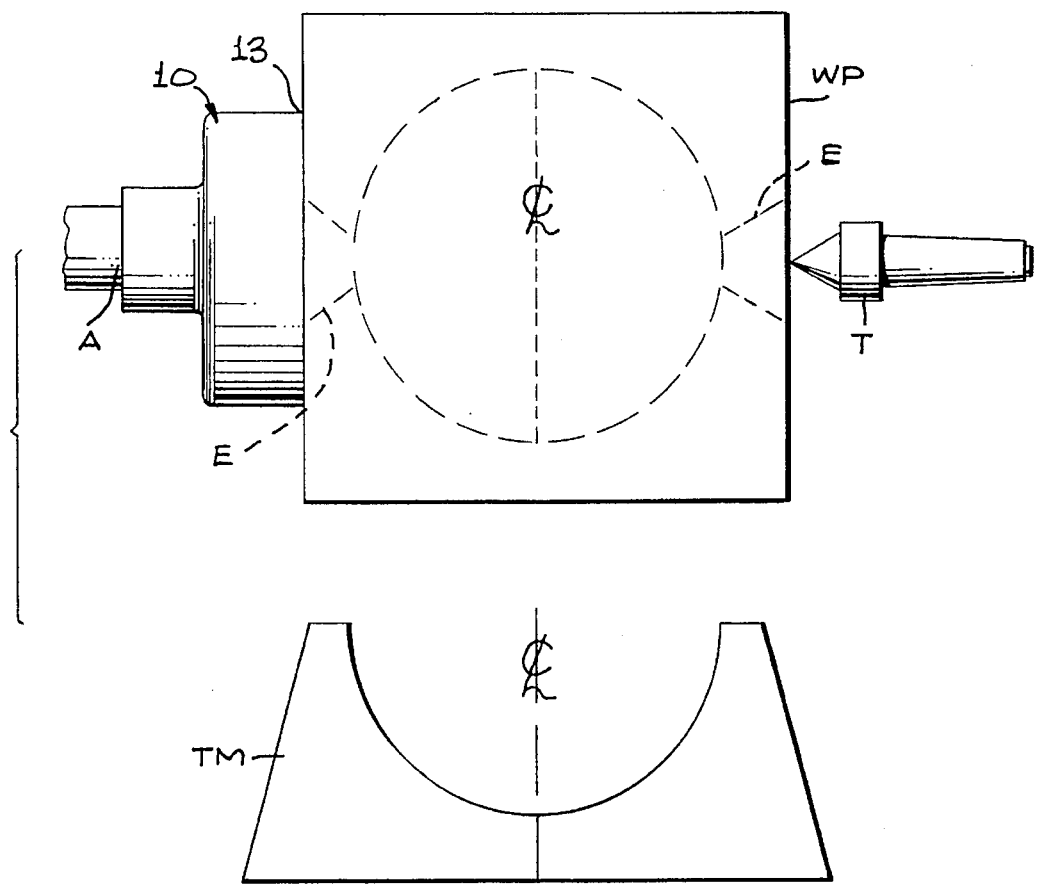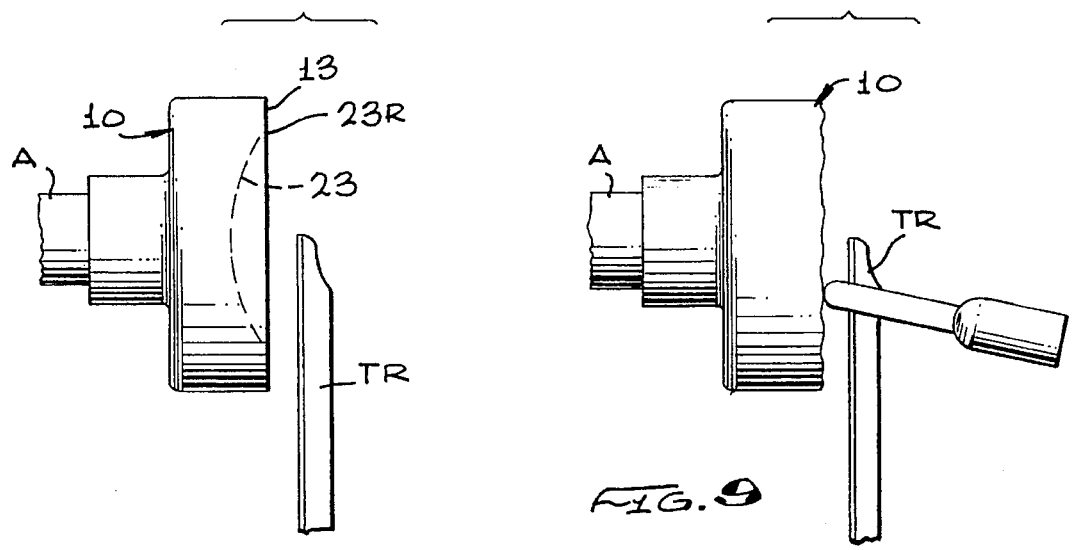

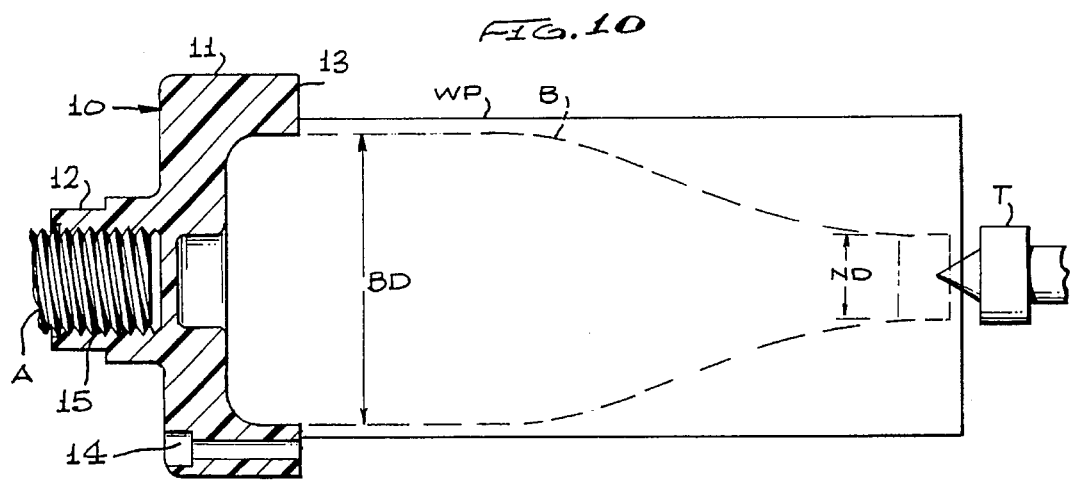
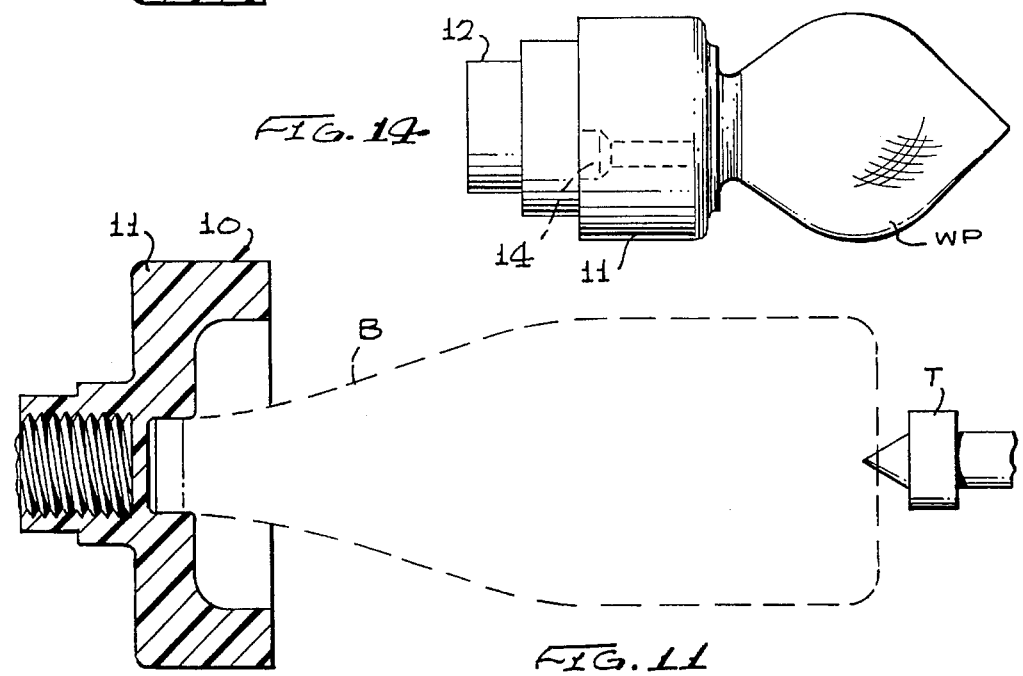
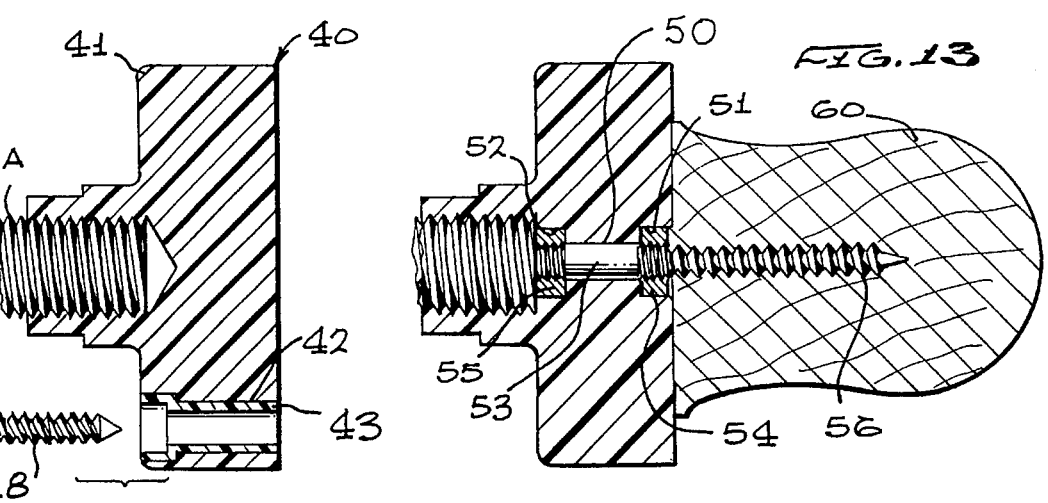

FACEPLATE FOR TURNING OBJECTS ON A LATHE OR THE LIKE

BACKGROUND OF THE INVENTION

From the earliest days of lathe turning, there has been a requirement attaching one end of a piece of wood or other material to a rotatable arbor, normally termed the head stock of the lathe. The axis of the head stock arbor defines the center line for turning what ever object is to be produced. In the case of short, flat objects, such as bowls, only the head stock arbor is used to act as total support for the workpiece to be turned. For longer objects, a tail stock with the center aligned with the axis is used to hold the opposite end of the blank, its only rotatable connection to the tail stock.

The classic form of attachment of the workpiece or blank to the rotating arbor is a metal faceplate made up of metal such as die cast zinc or in some certain cases, machined steel or aluminum. The faceplate typically will have a circular flat surface attached to a central cylinder designed to mate with and be secured to the arbor shaft of the head stock. The faceplate member is usually attached to the head stock arbor by engaging threads. In some cases, keys and keyways or set screws are used to secure to face place onto the rotating arbor.

The flat surface of the faceplate is usually attached to the workpiece by a plurality of fasteners such as screws which enter from the rear face through holes located between the central axis and the periphery, but usually the holes are three in number and spaced 120° apart.

The faceplate must be rigid and strong enough, not only to support the workpiece along or with the tail stock, but also must hold the workpiece securely during the initial chisel cut, which usually requires a series of cuts to remove the corners of the workpiece, which is often rectangular or square, to bring the workpiece to a circular diameter. The intermittent cutting of the chisel as each corner is removed in sequence produces great vibration and there can be no possibility of the workpiece blank separating from the faceplace.

In certain cases, the workpiece is secured to the faceplate by adhesives without a positive mechanical interconnection, as in the case of screws. In such case, the need is for the faceplate to be rigid, unyielding and additionally have good bonding properties with the adhesive used. This is very important.

One of the banes of the turner is the inability to make any cuts near the faceplate for fear of striking or cutting into the metal faceplate with immediate damage or destruction of the chisel and the faceplate. This usually results in unwanted post turning detailing which are time consuming and never can produce the same smooth results as a fully turned piece.

Another limitation on the existing metallic faceplates is that they cannot be used effectively to chuck a pre-turned and finished piece, nor to mount any sphere starting blank to make further turning operations. There is no good way to assure that the center line or turning axis of the lathe matches an actual diameter of an existing sphere.

Also existing metallic faceplates are not useful for receiving and holding any base of an object already turned and having a diameter less than the screw location diameter connection. Existing metallic faceplates are not suitable for adhesive bonding of small diameter objects. Existing metal faceplates generally do not provide any effective means for indexing of objects, for example, for fluting.

BRIEF DESCRIPTION OF THE INVENTION

Based with the foregoing state of the art, I have invented an improved faceplate which eliminates each of the foregoing problems.

My faceplate, in its preferred form, comprises a unitary body of polymeric material such as a styrene resin having a faceplate or body portion of significantly greater thickness than the case of metallic faceplates and having index marks in contrasting color along the depth of the plate portions for easy reading and accurate alignment. In contrast to the approximately ⅜" thickness of metallic faceplates, the depth of the plate portion of my invention is ¾" or greater.

The additional depth provides at least three advantages. The depth of the plate portion not only provides additional rigidity of the product and room for precise index marks, but allows the faceplate itself to be turned with the same chisel at the same time that the turner is finishing the bottom surface of the workpiece. The faceplate of the material selected by me turns just like wood with no burning, distortion or catching of the chisel as the blade first enters the faceplate.

Additionally, the faceplate may be turned from its attachment face to produce any circular shape for receiving the circular shaped end of any workpiece. For example, an existing sphere may be mounted on the head piece arbor merely by turning any diameter recess in the face of the faceplate. One need not have the diameter of the recess match the diameter of the spherical workpiece. The only requirement is that the recess in the faceplate has a diameter less than or equal to the diameter of the spherical workpiece blank. This insures a 360° rim contact when the spherical workpiece is placed against the faceplate. The only remaining step is to bring the tail stock center into contact with the opposite side of the sphere and the spherical workpiece is properly centered and ready for further turning operations. Moreover, unusual circular shapes may be duplicated in the faceplate to receive other than spherical workpiece with full assurance of proper centering and holding. In the case of partly finished pieces where a finished surface is to be inserted in the faceplate, felt lining may be added to the faceplate recess. The faceplate of my invention may be used for years without modification as a direct substitute for any existing metal faceplate. My faceplate may be modified as described above for any single turning operation or for repetitive reproduction of numerous identical turned parts having a base which is supported within a precise customized recess.

If a chemical type adhesive is used to attach the workpiece to my faceplate, very effective adhesives may be used without concerns for their removal after turning is completed. One may use a chisel and carefully turn the surface of the faceplate using a chisel such as a parting tool and the adhesive is gone in a matter of seconds and the faceplate is ready for next use. No part of the surface of the faceplate need be removed and there is no danger of damage to the chisel used.

My faceplate is ideal for use in the school environment where the instructor, after explaining the proper use of the lathe, cannot hover over the student at all times turning operation. The instructor may be assured that the student is not at risk in chisel striking a rotating metal faceplate.

My faceplate is likewise equally useful as a screw chuck with a screw inserted in the center of the faceplate. It therefore eliminates the need for separate screw chucks. Also, as the faceplate is used and actually turned down with various projects, it remains useful as a screw chuck.

BRIEF DESCRIPTION OF THE DRAWING

This invention may be more clearly understood from the following detailed description and by reference to the drawings in which:

FIG. 4 is a top plan view of my invention in use in producing a sphere from a rectangular workpiece;

FIGS. 5–7 are a series of three steps in doing post turning operations on a spherical workpiece blank;

FIG. 9 is top plan view of the step of removing adhesive from this invention without damage thereto;

FIGS. 10 and 11 illustrate my invention with custom recesses therein designed for holding opposite ends of the same workpiece to allow turning of the entire piece; and FIG. 12 is a diametrical view of another alternate embodiment of my invention;

FIG. 13 is a diametrical sectional view of a screw chuck embodiment of this invention; and FIG. 14 is a side elevational view of a faceplate in accordance with this invention after several uses in which much of the body has been turned away and it is still usable as a screw chuck.

DETAILED DESCRIPTION OF THE INVENTION

Figure 1:
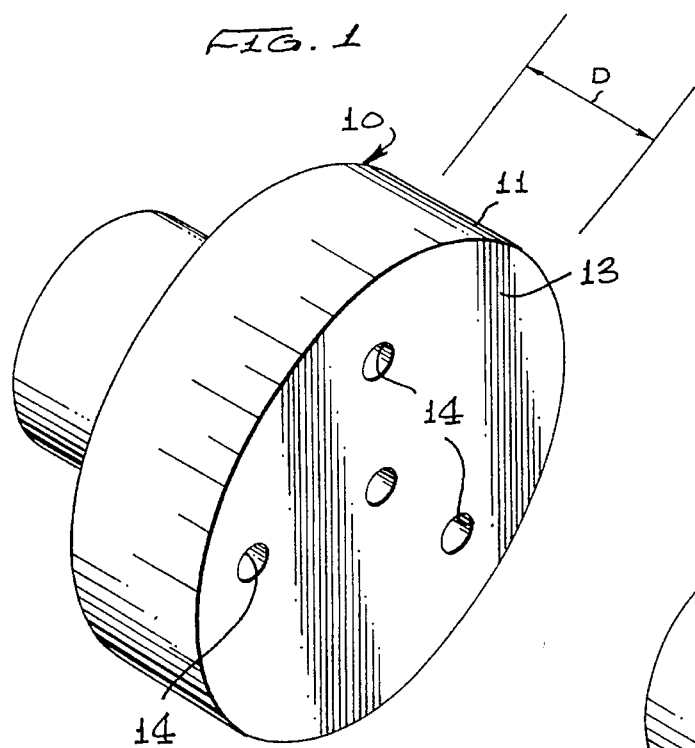
FIG. 1 is a perspective view of my invention.
Figure 3:
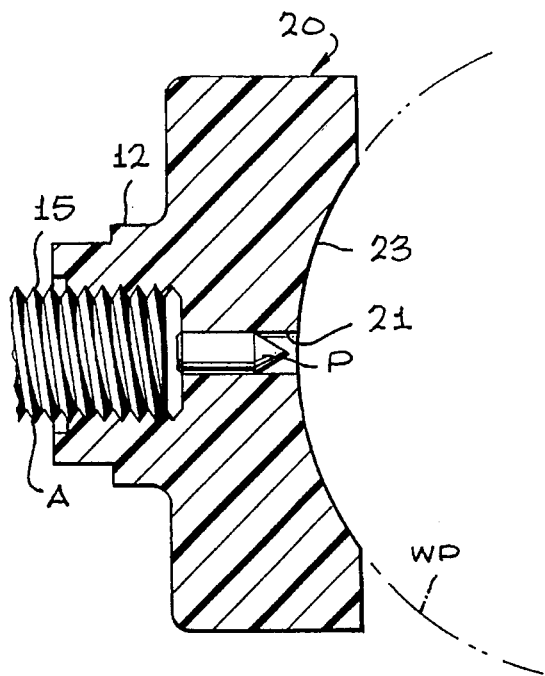
FIG. 3 is a diametrical section of an alternate embodiment of this invention for center marking of a workpiece.
Figure 2:
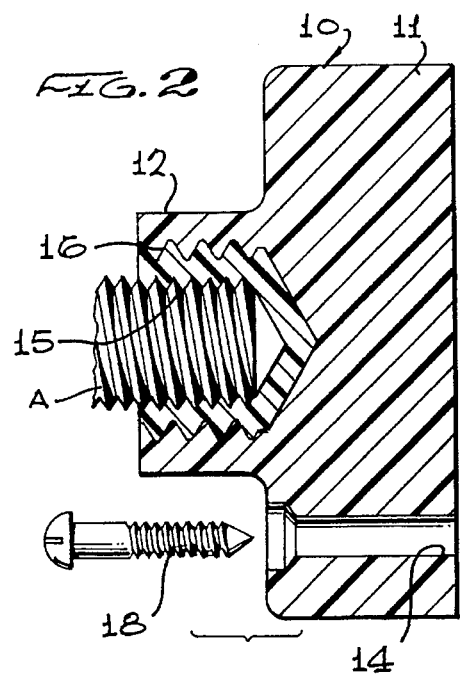
FIG. 2 is a diametrical sectional view of my invention.

Referring now to FIGS. 1 through 3, my invention comprises a faceplate generally designated 10 comprising preferably a unitary body of molded or turned polymeric material having a body portion 11 and a mounting portion 12 as well as a working faceplate surface 13. The working faceplate surface 13 is flat and contains a number of mounting holes 14, for example, three placed at 120° spacing to receive workpiece mounting screws 18 of FIG. 2 in the conventional manner. The mounting portion 12 is internally threaded at 15 in either an interchangeable insert 16 or directly into the mounting portion 12 as illustrated in FIG. 3.

Figure 1A:
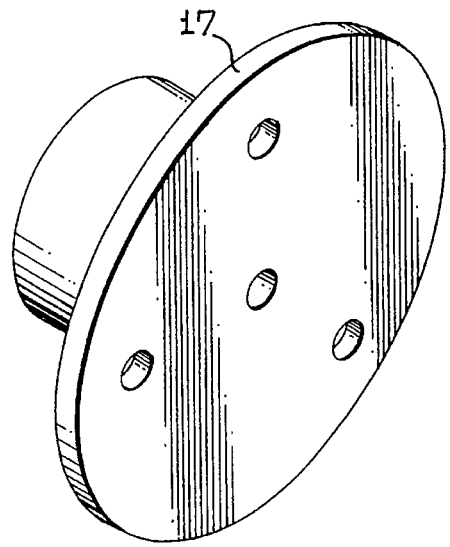
FIG. 1a is a perspective view of a conventional metal faceplate.

Note that the body portion 11 is significantly thicker than the conventional metal faceplate 17 of FIG. 1A. Typically, the faceplate 17 of FIG. 1a is a diecast metal such as zinc, aluminum or steel. In certain cases they are machined from many of the same materials. In my invention, the cylindrical wall of body 11 has a plurality of index long marks 20 and shorter marks 21 at 7½° increments, although other incremental angles may be used. The large surface of the body portion 11 allows the index marks 20 and 21 to be of substantial length, this makes their viewing easier and also provides for the situation where as described below, a portion of the body may actually be machined away intentionally or inadvertently without loss of the index marks and their function. The body depth D of FIG. 1 should be at least ¾" thick and can as thick as 2" if the need arises. My preferred depth is 1⅛".

Now referring to FIG. 3 in which no insert is used in the mounting portion 12 and the threads 15 are machined directly into the body. At the inner end of the threaded portion, a smaller hole 22, for example, ⅛" diameter is drilled through the block to receive a mating punch P with a center point to scribe a point on any workpiece blank placed on the faceplate 20. A workpiece WP is secured to the faceplate 10 by fasteners such as screws 18. In the case of FIG. 3, it may be seen that the faceplate 20 itself has been machined to produce a recess 23. The importance of such a cavity is best understood in connection with the description of FIGS. 5–7 below.

The embodiment of FIG. 3 allows the automatic centering of any spherical object having a diameter greater than the diameter of recess 23.

In selecting the material, I necessarily did extensive experimentation. The mere substitution of plastic for metal does not produce a satisfactory faceplate. A logical material to attempt to use to try was the polyamide resin produced by The DePont Co. under the trademark "Nylon," however, I found it to be brittle, tending to shatter under stress, and did not respond well when contacted by a chisel.

Next, I tried another material sold by The DuPont Company under the trademark "Delrin" which is well known for its toughness but discovered that it had too great a tendency or move under high loads, particularly when working a piece without a tail stock. This material likewise did not hold attachment screws well.

I tried the typical polyethylene and found it to be too flexible and soft and any screw engagement did not hold well. Screws tend to imbed themselves in the workpiece and the workpiece tended to become loose.

I attempted to use polyethylene styrene and foam which is produced by introduced by using a foaming agent into the plastic to improve shrinkage and outer surfaces. No foamed prototypes of the base plate were acceptable.

Faceplates are used primarily for turning wood workpieces. For primarily painted structural pieces such as post tops and the like, soft woods are used such as cedar, redwood, hemlock and various pines or furs. For ornamental pieces which are finished showing the grains, hardwoods are usually used. Examples are cherry, black walnut, ash, hickory or oak.

The modulus of elasticity of the soft woods generally range from 8,500 KPSI to 11,500 KPSI while the modulus of elasticity of hardwoods runs from approximately 11,800 KPSI to a maximum of 20,200 KPSI for shagbark hickory. This information is tabulated in the Standard Handbook for Engineers, Marks, Ninth Edition, Copyright 1987, McGraw-Hill Book Company, referencing the "Wood Handbook", Tropical Woods, No. 95 and unpublished data from the U.S. Forest Products Laboratory.

Although most polymers have a much lower modulus of elasticity than woods, I have found that the preferred copolymer falls within this range having an intermediate value of approximately 1,700 KPSI.

Therefore, using my faceplate, any wood workpiece, softwood or hardwood will turn much the same as the faceplate and there will be no tendency for the chisel to drift as it turns at the junction between the faceplate and the workpiece.

After this experimentation, I discovered that an advanced styrenic resin (ASR), RESIN 4800 of the Dow Chemical Company exhibited excellent properties in making my invention. It did not exhibit any bending under stress far exceeding normal use. The material held screws without distortion and responded well to contact with a chisel and it turned much like wood. A similar turning characteristic to wood is important when making a parting line which is partly in the wood and partly in the faceplate. A hardness difference would tend to urge the chisel to depart from the desired point of contact. Therefore, I find that advanced styrene resin, with the following characteristics to be the preferred material.

| MATERIAL: RESIN 4900 STYRENE-BUTADIENE COPOLYMER | | | 94–99% |
|---|---|---|---|
| MINERAL OIL | | | 5% MAX |
| MECHANICAL PROPERTIES: | ASTM | ENGLISH | METRIC |
| Yield tensile strength | D638 | 3,500 psi | 249 Kg/cm$^2$ |
| Ultimate tensile strength | D638 | 2,800 psi | 196 Kg/cm$^2$ |
| Ultimate elongation | D638 | 50% | 50% |
| Tensile Modulus /cm$^2$ | D638 | 260,000 psi | 18,200 Kg |
| /in$^2$ | | 1677 kpsi | |
| Flexural Strength | D790 | 6,500 psi | 455 Kg/cm$^2$ |
| Flexural Modulus /cm$^2$ | D790 | 270,000 psi | 18,900 Kg |
| /in$^2$ | | 1741 kpsi | |

MANUFACTURER: DOW CHEMICAL COMPANY, Midland, MI

In FIG. 4, a typical use of my invention is illustrated. In FIG. 4, my faceplate 10 is mounted on the arbor A of a lathe L, which has a tailstock T. A workpiece WP, for example, a block of hardwood such as maple, walnut or the like, is secured to the working faceplate surface 13 of faceplate 10, centered as well as possible and the tailstock T, similarly is closely centered using conventional shop practice. A template TM with a semicircle is used to define the final shape, e.g., a sphere.

The workpiece WP is secured to the faceplate 10 by either chemical adhesive or fasteners.

The turner, using the appropriate chisels, in sequence turns the part until it matches the template with only a short head and tail portions E of unturned workpiece securing the workpiece WP to the faceplate 10 and the tailstock T. The nearly completed shape is removed from the lathe and a cup shaped recess 23 as shown in FIG. 3 is turned in the surface of the faceplate 10. Its diameter of recess 23 should be equal or less than the diameter of the sphere being turned.

The partially turned workpiece WP is turned 90° in any direction and remounted with the turned surface resting in the faceplate recess 23. The workpiece WP is automatically centered and the tailstock need only be brought up into engagement with the sphere for proper alignment. Next the remnants of unturned head and tail end portions E are turned and a completely turned sphere is ready for sanding and finishing. This was all possible with precise accuracy and with a minimum of effort by reason of the capability of the faceplate 10 to be turned, just like the workpiece WP.

Often it is desired to take a preexisting sphere and to do some post treatment such as grooving or splitting it. In order to perform such post treatment, it is essential that the sphere be mounted on a lathe precisely on a diameter so that it will turn without wobbling. Unless the sphere is properly mounted, it is impossible to do such post treatment. Employing this invention, it is possible to be assured of proper mounting of any sphere employing the method illustrated in FIGS. 5–7.

Figure 6:
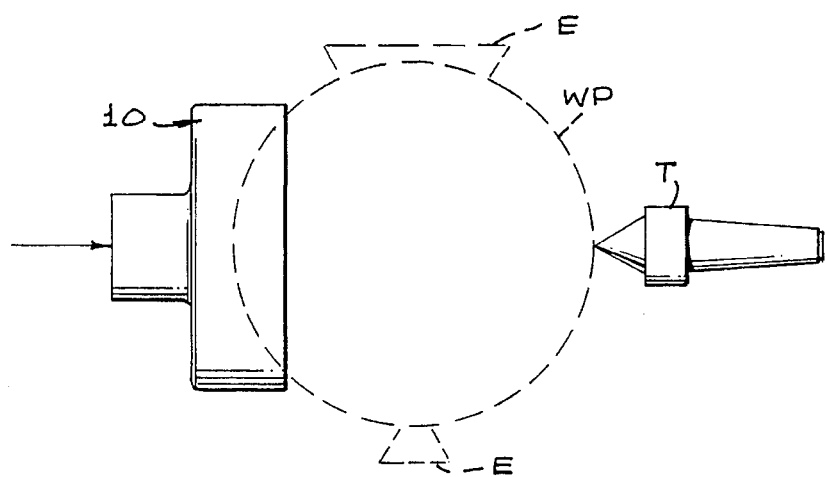

Referring now to FIG. 5, the face plate of this invention is mounted on the arbor A of the lathe headstock and the lathe toolrest TR is adjusted to a position parallel to the face 13 of faceplate 10. Next, a recess such as the recess 23 of FIG. 3 is turned into the face of faceplate 10. The recess 23 is preferable in the form of a segment of a spherical cavity of the same diameter as the sphere to be post treated. If it is not practical to duplicate the size of the sphere in the faceplate 10, then it should have a lesser diameter so that the sphere when placed in the recess 23 contacts the rim 23R of FIG. 3. The sphere S will then make line contact with the faceplate 10. The recess 23 may be lined with a resilient material or temporary adhesive to hold the sphere firmly without damage to its surface. While being held in position with one hand, the tailstock is brought up into engagement with the sphere as illustrated in FIG. 6. The opposite end point of contact of the tailstock center is exactly on the diameter of the sphere at the headstock arbor and faceplate 10.

Figure 7:
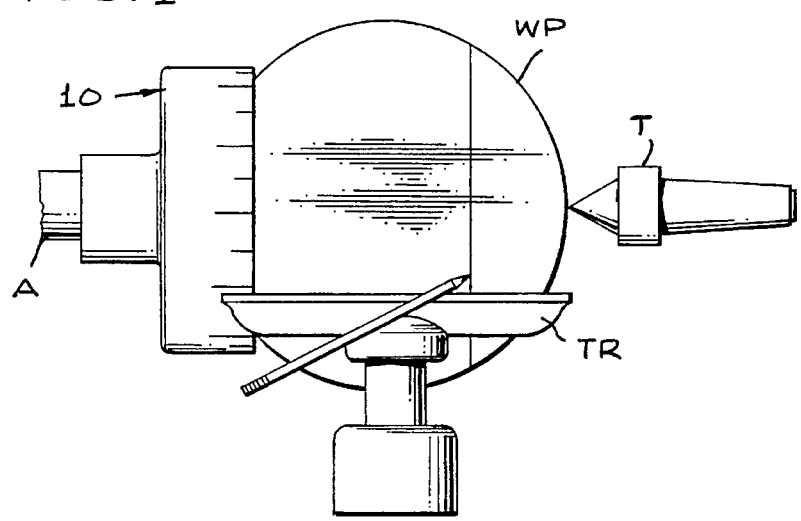

Post treatment turning then proceeds as illustrated in FIG. 7 and the project may be completed and the modified sphere removed. This same type of post treatment is possible in a large variety of preturned parts. The sphere is illustrated since it is probably the most difficult shape to handle on a lathe and illustrates the versatility of my invention.

Figure 8:
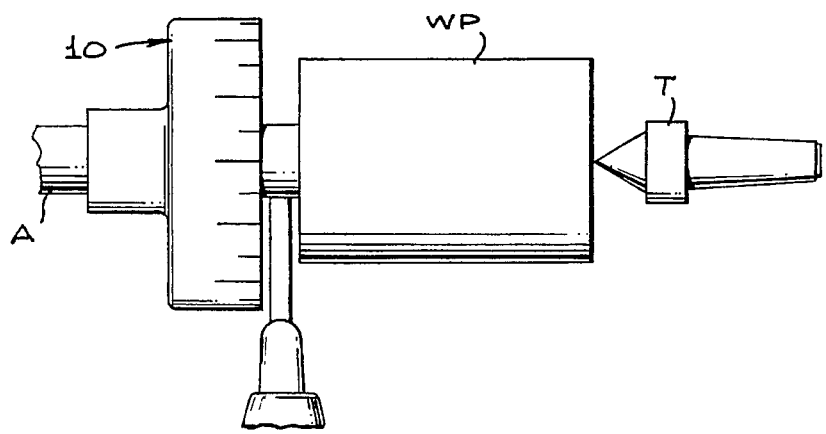
FIG. 8 is a top plan view showing the use of my invention in final turning operations to the end of a workpiece mounted on my faceplate.

One of the most important advantages of this invention is illustrated in FIG. 8. There a workpiece WP is mounted between faceplate 10 and the tailstock T using an adhesive to secure the workpiece WP to the faceplate 10. Normal turning proceeds to the shape desired. Often there is a need to turn the end. In the past, using metal faceplates, any attempt to turn the end regularly results in contact of the chisel with the faceplate and damage to the chisel. Employing this invention, the faceplate 10 turns just like most hardwoods and end turning as shown in FIG. 8 is possible down to a minimum diameter such as 1 inch. The small remaining material is removed by other tools. The amount of the faceplate 10 removed in such operation does not affect its utility for use as a normal faceplate. It may be reused several times in the manner of FIG. 8 until it is reduced to a depth in which the index marks are gone. When it reaches a depth of ¾ inch, it should be replaced or may be used as a screw chuck as is disclosed in FIGS. 14 and 15.

Whenever adhesive is used to fasten a workpiece to faceplate 10, it may easily be removed by turning using a chisel as illustrated in FIG. 9.

FIGS. 10 and 11 illustrate another related use of this invention to finish the ends of a workpiece such as a wood turned simulated wine bottle B shown in dashed lines in these figures. FIG. 10 shows a setup employing my face plate for turning a shape such as wine bottle B from a piece of stock constituting the workpiece WP. The basic shape of the bottle is turned leaving ends E which may be removed by hand or power tool after removal from the lathe.

The base diameter BD and the neck diameter ND are next measured with a caliper. The shaped bottle is removed from the fact plate and the faceplate 10 is turned to produce a complex recess with two sections having diameters BD and ND for a slip fit with the respective base and neck ends of the bottle. FIG. 11 shows the faceplate after turning. Before turning to produce the double recess, the faceplate 10 is in the form of FIG. 1. The recess may be lined with felt or other resilient material or a temporary adhesive. Final turning down to the tailstock diameter may now be accomplished, first with the base of the bottle B in the faceplate 10 and the neck centered on the tailstock as shown in FIG. 11.

Finally the bottle B is reversed with the neck located in the corresponding recess of faceplate 10 and the base B is given its final turning down to the tailstock T point and turning is completed.

Since this invention allows the faceplate to be turned and shaped, it is contemplated that the turner's chisel will enter the faceplate from the cylindrical surface or the face 13. Since this is a new capability not present in conventional metal faceplates, there is a danger that the turner, particularly, if the turner is a student, will forget about the presence of metal fasteners such as screws 18 of FIG. 3.

I have found that it is possible to give a warning to the turner as the chisel approaches a fastener and before any damage to the chisel can occur. In accordance with this feature of this invention, the faceplate 40 of FIG. 12 is fabricated from a polymer of a selected color, e.g., black. The body 41 includes larger stepped openings 42 for each fastener and an insert 43 having a contrasting color, e.g., white, is located in the opening 42 and thus surrounds the fastener 44. Whenever the chisel enters the faceplate 40 it will produce a stream of black chips or a black cutting. If the chisel enters the insert, the turner will be alerted by the change in color of some of the chips or the cutting and he is alerted that the chisel is about to strike metal. He can then cease cutting any deeper and save his chisel. The inserts 43 also have the advantage of being replaceable if they become worn from repeated use, even if never cut by a chisel.

A commonly used accessory for the lathe is the screw chuck. It mounts on the headstock arbor and usually has a small faceplate with an axially extending woodscrew which engages the center of the workpiece. The screw chuck is useful for smaller diameter parts which must be held by the headstock arbor only. A turned ball end for furniture is a prime example of a relative short 3"–6" turned part which is normally produced using a screw chuck.

My faceplate may easily be used as a screw chuck as is illustrated in FIGS. 13 and 14. Since the faceplate of my invention is machinable by the user in any way that he desires, he may take one of my standard faceplates 10 and drill a center hole 50 with countersink recesses 51 and 52 in opposite faces of faceplate 10. A machine screw-woodscrew fastener 53 is secured to the faceplate 10 by nuts 54 and 55. The woodscrew end 56 is screwed into a matching predrilled hole in the center of the workpiece blank. The finished turned knob 60 is shown on the faceplate ready for removal. The original step of turning off the corners of flat stock to produce a cylindrical workpiece can be done using the diameter of the faceplate 10 body 11. Using my faceplate as a screw chuck allows much larger diameter pieces to be turned rather than the 1¼ to 1½ inch normal limitation on screw chucks. The use of a parting tool is eliminated since it is possible to turn directly into the chuck as is illustrated in FIG. 14.

The faceplate of FIG. 13 after extensive use is shown in FIG. 14. The body portion 11 has been turned down in various projects including those in which it is used as a screw chuck. The indexing of FIG. 1 has been turned away and various cuts in finishing the bottom of a workpiece may be seen. Even the holes 14 of FIG. 1 have been partly turned away and only the remaining portion appears in FIG. 14.

Employing my invention, the turner has virtually complete freedom in turning workpieces. Accurate indexing is possible. Turning right at the workpiece-faceplate interface is possible. Chemical or mechanical fastening of the workpiece to the faceplate is possible. Either conventional three screw fastener mounting is possible. Warning of impending contact with a fastener is possible using contrasting inserts as in the case of FIG. 12 and a second life as a screw chuck is available at any time employing this invention.

The foregoing descriptions of various embodiments are representative of the concept of this invention and constitute the best mode known to me for practicing the invention. These embodiments are not to be considered limiting since it is clear that one of ordinary skill in the art could produce other embodiments without departing from the spirit of this invention. Therefore this invention is not defined or limited by the foregoing embodiments but rather by the following definitions of my invention as set forth in the following claims including the scope afforded by the doctrine of equivalents.

What is claimed is:

1. A faceplate for lathes and the like having a rotatable arbor comprising a body of polymeric material having a generally planar face for attaching workpieces to be turned, said body having a depth of at least ¾ inch, and a cylindrical wall adjacent to said planar face including indicia marks around the periphery of said cylindrical wall at predetermined angular spacing about the axis of rotation of said faceplate; and a connection portion of said body constituting a rearward extension of said body including a recess for receiving the end of said rotatable arbor.

2. A faceplate for lathes and the like comprising a body of polymer material comprising:

an attachment portion for attachment to an arbor of a turning machine for rotation about the axis of the arbor;

a body portion presenting a flat face centered about the axis of the attachment portion and the arbor of the turning machine;

said body portion including at least one opening therethrough dimensioned to receive a screw fastener to extend into a workpiece to be attached to the faceplate;

said body portion including a region surrounding said opening of different material from said body portion;

said faceplate and region surrounding said opening being capable of machining by contact with a cutting tool used with said turning machine without damage to the cutting tool;

said faceplate and surrounding region having different properties whereby machining into said surrounding region alerts the user of possible impending contact with a screw fastener.

3. A faceplate in accordance with claim 2 wherein the different properties of said faceplate and surrounding region are color.

4. A faceplate in accordance with claim 2 wherein said surrounding region comprises an insert.

5. A faceplate in accordance with claim 2 wherein said body includes three openings and each of said openings includes an insert of contrasting color from the color of the body portion.

* * * * *